United States Patent
Wilkes

(10) Patent No.: US 9,363,262 B1
(45) Date of Patent: Jun. 7, 2016

(54) AUTHENTICATION TOKENS MANAGED FOR USE WITH MULTIPLE SITES

(75) Inventor: T. Clay Wilkes, North Salt Lake, UT (US)

(73) Assignee: GALILEO PROCESSING, INC., Salt Lake City, UT (US)

( * ) Notice: Subject to any disclaimer, the term of this patent is extended or adjusted under 35 U.S.C. 154(b) by 1685 days.

(21) Appl. No.: 12/210,633

(22) Filed: Sep. 15, 2008

(51) Int. Cl.
  *H04L 29/06* (2006.01)
  *H04L 9/32* (2006.01)
  *G06F 21/31* (2013.01)
  *G06F 21/34* (2013.01)

(52) U.S. Cl.
  CPC ............ *H04L 63/0853* (2013.01); *G06F 21/31* (2013.01); *G06F 21/34* (2013.01); *H04L 9/3228* (2013.01); *H04L 9/3234* (2013.01); *H04L 63/083* (2013.01); *H04L 63/0838* (2013.01); *H04L 63/0846* (2013.01)

(58) Field of Classification Search
  CPC . H04L 9/3228; H04L 9/3234; H04L 63/0838; H04L 63/0846; H04L 63/083; H04L 63/0853; G06F 21/31; G06F 21/34
  USPC .................. 726/2, 4–6, 9; 713/155, 168, 182
  See application file for complete search history.

(56) References Cited

U.S. PATENT DOCUMENTS

| | | | | |
|---|---|---|---|---|
| 5,060,263 A * | 10/1991 | Bosen et al. | ................... | 713/184 |
| 5,361,062 A * | 11/1994 | Weiss et al. | ................... | 340/5.26 |
| 6,088,799 A * | 7/2000 | Morgan et al. | ................. | 713/182 |
| 7,552,467 B2 * | 6/2009 | Lindsay | ............................ | 726/5 |
| 7,673,327 B1 * | 3/2010 | Polis et al. | ......................... | 726/5 |
| 8,006,300 B2 * | 8/2011 | Mizrah | ............................ | 726/20 |
| 8,087,074 B2 * | 12/2011 | Popp et al. | ......................... | 726/9 |
| 8,130,961 B2 * | 3/2012 | Machani et al. | ............... | 380/277 |
| 2002/0126841 A1 * | 9/2002 | Arai | .................................. | 380/46 |
| 2004/0083393 A1 * | 4/2004 | Jordan et al. | .................. | 713/202 |
| 2005/0093724 A1 * | 5/2005 | Berg | ............................. | 341/142 |
| 2006/0174104 A1 * | 8/2006 | Crichton et al. | ............... | 713/155 |
| 2007/0130463 A1 * | 6/2007 | Law et al. | ...................... | 713/168 |
| 2007/0186277 A1 * | 8/2007 | Loesch et al. | ...................... | 726/4 |
| 2007/0220253 A1 * | 9/2007 | Law | ............... | 713/168 |
| 2007/0255951 A1 * | 11/2007 | Grynberg | ...................... | 713/168 |
| 2008/0034216 A1 * | 2/2008 | Law | ............... | 713/183 |

(Continued)

OTHER PUBLICATIONS

Weaver, Alfred C. "Enforcing distributed data security via Web services." Factory Communication Systems, 2004. Proceedings. 2004 IEEE International Workshop on. (pp. 397-402). IEEE, 2004.*

(Continued)

*Primary Examiner* — Kari Schmidt
(74) *Attorney, Agent, or Firm* — Maschoff Brennan

(57) ABSTRACT

A method and system for authenticating an account holder using multi-factor authentication. An account holder is associated with a token device configured to supply the account holder with a dynamic password. The dynamic password has a current value that is synchronously stored at an aggregator service and at the token device. The dynamic password is changed periodically. The aggregator service also associates the account holder with at least one account maintained by the account providers. The aggregator service receives an authorization request from either the user or from one of the account providers. The aggregator service performs an authorization operation for determining if a proffered dynamic password submitted by the user during an attempt to login matches the current value of the dynamic password stored at the aggregator service.

15 Claims, 3 Drawing Sheets

(56) References Cited

U.S. PATENT DOCUMENTS

| | | | |
|---|---|---|---|
| 2008/0035724 A1* | 2/2008 | Vawter | G06F 20/20 235/380 |
| 2008/0086759 A1* | 4/2008 | Colson | 726/2 |
| 2008/0098464 A1* | 4/2008 | Mizrah | 726/5 |
| 2009/0019155 A1* | 1/2009 | Krzanowski et al. | 709/225 |
| 2009/0271462 A1* | 10/2009 | Schneider | 708/250 |

OTHER PUBLICATIONS

Madsen, Paul, Yuzo Koga, and Kenji Takahashi. "Federated identity management for protecting users from ID theft." Proceedings of the 2005 workshop on Digital identity management. (pp. 77-83). ACM, 2005.*

* cited by examiner

AUTHENTICATION TOKENS MANAGED FOR USE WITH MULTIPLE SITES

BACKGROUND

1. The Field of the Invention

The present invention relates generally authenticating users. More specifically, embodiments of the present invention relates to methods and systems for managing multifactor user authentication for use with multiple account providers.

2. the Relevant Technology

Computers and computing systems have affected nearly every aspect of modern living. Computers are generally involved in work, recreation, healthcare, transportation, entertainment, household management, online banking, shopping, etc. The functionality of computers has also been enhanced by their ability to be interconnected through various network connections.

The increased use of computers is accompanied by the need for increased computer security. Many computer systems and networks require that a user perform an authentication process prior to accessing the services provided by the computer system or network. Authentication is a way to ensure that the user who attempts to perform functions in a computer system or network is in fact the user who is authorized to do so. Common examples of access control involving authentication include withdrawing cash from an ATM, controlling a remote computer over the Internet, using an Internet banking system, purchasing items over the Internet, and the like.

An authentication procedure typically requires a user attempting to gain access to the computer system or network to pass one or more tests. For example, many computer related authentication procedures require the user to submit a username and password. If the username and password proffered by the user match a username and password stored at the system the user is attempting to gain access to, the system authorizes the user to access certain content on the system.

The above example, where a user is required to submit a single password in order to authenticate, is commonly referred to as a single action authentication, meaning that the user is only required to submit a single form of authentication (in addition to the username) in order to authenticate. Single-action authentication is often problematic because the single form of authentication can easily be intercepted, lost, or stolen. Multi-factor authentication has been introduced to provide an additional layer of security by requiring another form of authentication.

One example of multi-factor authentication requires a first form of authentication, which is generally something that the user knows, and another form of authentication, which is generally something the user possesses. For example, the first form of authentication may include a username, password, or combination of a username and password. A second form of authentication may include a small token device which is carried by the user. The token device may include a compact electronic device, such as a keyfob, a smartcard, a USB device, cell phone or the like, which displays information to the user. By entering this information into the system, the user proves that he or she is in possession of the information provided by the token device. If the first and a second form of authentication are correct, the user is authenticated.

One drawback of using a token device to perform multi-factor authentication includes the cost of distributing the token devices. For example, in many instances, each token device may cost $100.00 or more. When considering that each organization employing multi-factor authentication often has thousands of users, and each user may potentially need a separate token device for each of the user's accounts, the cost of using token devices to perform multi-factor authentication may be prohibitive.

BRIEF SUMMARY

One embodiment is directed to a method of authenticating an account holder using multi-factor authentication. A user or an account holder is first associated with a token device configured to supply the account holder with a dynamic password. The dynamic password has a current value that is synchronously stored at an aggregator service and at the token device, and which is changed periodically. The aggregator service associates the account holder with at least one account maintained by the account providers. During a login attempt the aggregator service receives an authorization request from either the account holder or from one of the account providers. The authorization request includes a unique client identifier for identifying the account holder. Finally, the aggregator service performs an authorization operation for determining if a proffered dynamic password submitted by the user during an attempt to login to a selected account matches the current value of the dynamic password stored at the aggregator service and associated with the account holder.

In another example for authenticating an account holder using multi-factor authentication, a login request including a proffered password and a client identifier are received. The client identifier is typically a unique value that identifies the account holder. The account provider communicates with an aggregator service to authenticate the login request. The account provider determines if the proffered password matches the current value of a dynamic password that is synchronously stored at the aggregator service and at a token device provided to the account holder. This can be done by submitting the proffered password to the aggregator service or by receiving a password from the aggregator service. The account provider grants the login request if the proffered password matches the current value of the dynamic password that is synchronously stored at the aggregator service.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
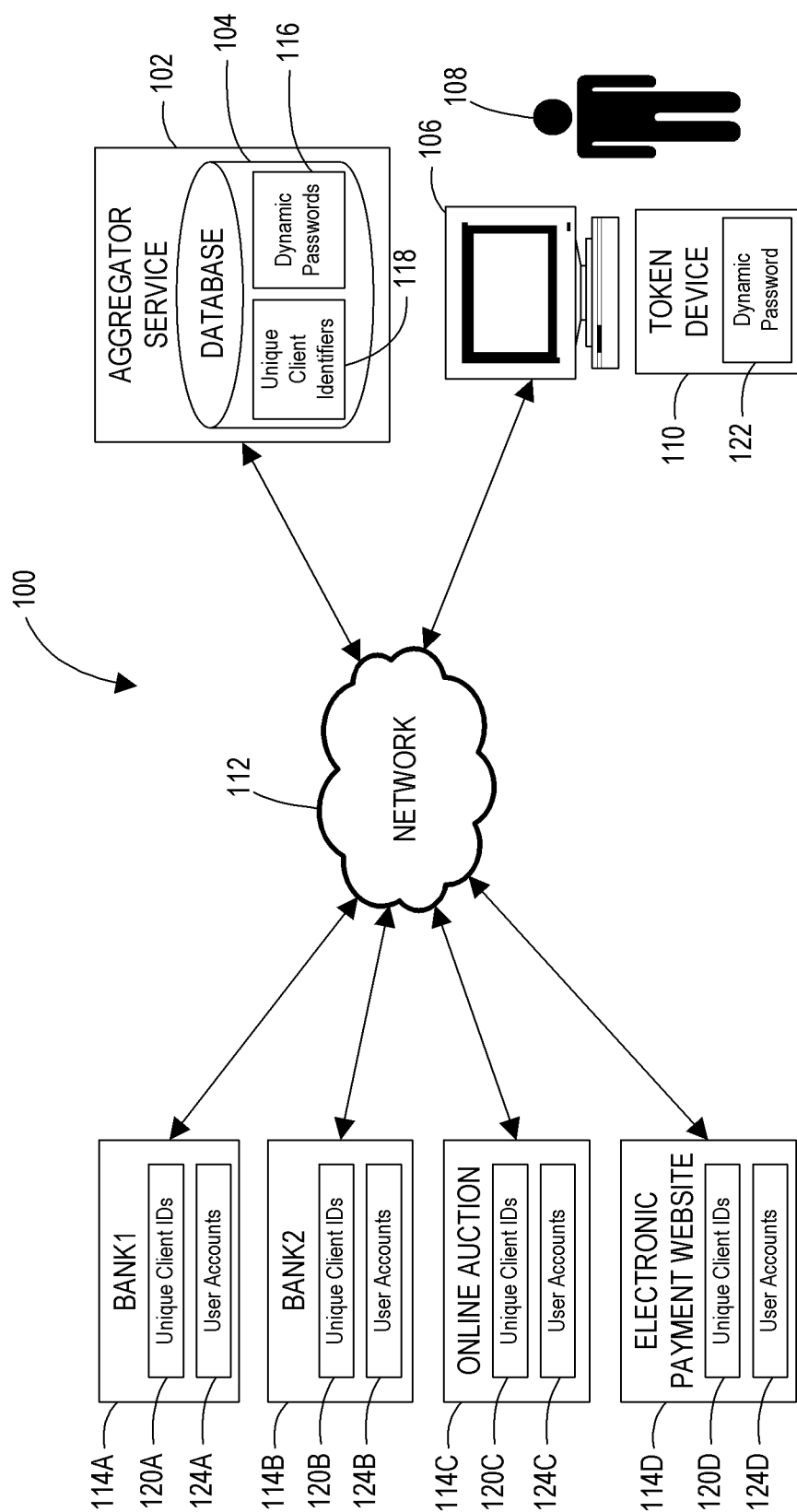
FIG. 1 illustrates a distributed computing system for authenticating a user using multi-factor authentication.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to an aggregator service for facilitating multi-factor authentication of an account holder having accounts with one or more account providers. The account holder is provided with a token device which supplies the account holder with a dynamic password. The aggregator service collects unique client identifiers from each of the account providers with which the account holder has accounts. Each unique client identifier is associated with one of the account holder's accounts managed by the corresponding account provider.

Thereafter, the account holder can login to a selected account by submitting to the account provider a first form of authentication and the dynamic password as indicated by the token device. Upon receiving the login request from the account holder, the account provider forwards the unique client identifier associated with the account holder and the dynamic password submitted by the account holder to the aggregator service. The aggregator service ensures that the password submitted by the account holder matches the dynamic password as is currently provided by the token device. If the passwords match, the aggregator service instructs the account provider that the account holder can properly be authenticated.

As used herein, the phrase "multi-factor authentication" refers to any authentication mechanism where more than one form of authentication is required to authenticate a user. Multi-factor authentication is typically used to offer an additional layer of protection for highly confidential and personal information, such as financial accounts, business accounts, confidential data stores, and the like. As described previously, one mechanism for multi-factor authentication includes a first form of authentication, which is generally something that the user knows, and an additional form of authentication, which is generally something the user possesses.

For example, the first form of authentication may include a username, password, or combination of a username and password. The additional form of authentication may include a small token device which is carried by the user. The token device may include a compact electronic device which displays a number or alphanumeric string on a small screen, including a cell phone. By entering this number displayed on or provided by the token device into the system requiring user authentication, the user proves that he or she is in possession of the token device. In one embodiment, the number displayed by the card may frequently change, usually every 30 to 60 seconds. The change period may be adjusted to other periods (such as hourly, daily, etc.). The system to which the user is authenticating also knows the number which should appear on the screen of the token device. If the number possessed by the system and the number submitted by the user match and the first form of authentication (i.e., username and/or password) submitted by the user is also correct, the user is authenticated.

Referring now to FIG. 1, a more detailed example of multi-factor authentication is illustrated using a diagrammed reference to a distributed computer system 100. The distributed computer system 100 includes account providers 114A, 114B, 114C and 114D (also referred to as providers 114), an aggregator service 102 and a client system 106. The account providers 114, the aggregator service 102 and the client system 106 communicate with one another via a network 112.

The network 112 represents any network that facilitates communication between the account providers 114, the aggregator service 102 and the client system 106, and may include, by way of example, the Internet, telephony networks (e.g., lanline or PSTN), cellular networks, data networks, satellite networks, 802.11 networks, personal computer networks (e.g., LAN, WAN), wireless networks (e.g., Bluetooth, WiFi), and the like or any combination thereof.

The aggregator service 102 provides account providers 114 with the ability to offer the security of multi-factor authentication without having the expense of distributing token devices 110 to each of their account holders 108. The user also has the assurance of multi-factor authentication with a single token device that can be used for multiple accounts or account providers. Thus, the aggregator service 102 provides the account holder 108 with the ability to perform multi-factor authentication with multiple account providers 114 by way of a single token device 110. Conversely, without the aggregator service 102, the account holder 108 would typically be required to maintain a separate token device 110 for each account provider 114.

In general, the aggregator service 102 includes a repository for storing unique client identifiers 118 which link an account holder 108 to the account holder's accounts 124A, 124B, 124C and 124D with each of the account providers 114. The aggregator service 102 may also provide each account holder 108 with a token device 110. The aggregator service manages a dynamic password 116 and 122 associated with the token device 110. The account holder 108 may register with the aggregator service 102 by visiting the aggregator service's web site or by registering in person or by telephone. The account holder 108 may be directed or recommended to register with the aggregator service 102 by one of the account providers 114 that require multi-factor authentication.

Following registration, a token device 110 is provided to the account holder 108. The token device 110 provides the account holder 108 with a dynamic password 122. The dynamic password 122 may include an alphanumeric code which can be communicated to the account provider 114 and/or the account holder 108. For example, the alphanumeric code may be visually communicated to the account holder 108 on a small electronic display, audibly communicated to the account holder via a small speaker, digitally communicated directly to the client system 106 via a wired or wireless connection, and the like. As described previously, the dynamic password 122 is continually updated so that an unscrupulous interceptor gains little or no advantage by reading the current value of the dynamic password 122. For example, the dynamic password 122 may be updated every 30 to 60 seconds, but can also be updated more or less often. Form factors that may be employed as a token device 110 include smartcards (i.e., pocket-sized card with embedded integrated circuits), USB devices, keyfobs (i.e., a decorative item carried with a keychain), cell phones and the like. Furthermore, an account holder's existing cellular telephone, personal data assistant (PDA), or other existing handheld wireless device, may be configured to act as a token device, and may receive the dynamic password 122 via the handheld wireless device's existing wireless connection.

The dynamic password 122 and 116 is synchronously stored at both the aggregator service 102 and at the token device 110. In other words, at the approximate time at which the value of the dynamic password 122 is updated at the token device 110, the same value is updated at the aggregator service 102. The synchronous storage of the dynamic password 122 preferably includes changing the values stored at the aggregator service 102 and the token device 110 at substantially the same time. However, the exact time at which the values are changed may understandably vary due to imperfections at the aggregator service 102 and/or at the token device 110 and/or to delays in system communication. In one embodiment, the dynamic password can be time-stamped and in some instances may also have expiration times.

The synchronization of dynamic passwords 116 and 122 may be accomplished in a number of ways. For example, algorithms may be used at both the token device 110 and at the aggregator service 102 which generate identical passwords at both locations. The updating of the dynamic password value is synchronized by placing clocking devices at both the token device 110 and the aggregator service 102. Periodically, the token device 110 may communicate with the aggregator service 102 to ensure that the clocking devices and algorithms are synchronized. In place of algorithms, a table of dynamic password values may be stored at both the aggregator service 102 and the token device 110, wherein the current value of the dynamic password 122 and 116 is pulled from the table of password values.

Alternatively, the synchronization of the dynamic password 116 and 122 may be accomplished by way of a communications link between the aggregator service 102 and the token device 110. When the aggregator service 102 updates the value of the dynamic password 116, the new value is communicated to the token device 110, which receives the value and updates the dynamic password 122 accordingly. The communication link between the aggregator service 102 and a token device 110 may include a wireless link, such as cellular networks, terrestrial networks, satellite networks, IEEE 802.11, Wireless Fidelity (WiFi), WiMAX, and the like. Other mechanisms for synchronizing the dynamic password 116 and 122 also exist, as will be appreciated by one of ordinary skill in the art.

After the account holder 108 has registered with the aggregator service 102, the account holder may instruct each account provider 114 that requires multi-factor authentication to provide the aggregator service 102 with a unique client identifier 120A, 120B, 120C and 120D. Alternatively, the aggregator service 102 could work directly with the account providers 114 to enroll the account holders into the service. The unique client identifiers 120 may include any value which is used by the account providers 114 to link the account holder 108 to an account 124 held by the account providers 114. For example, the unique client identifiers 120 may include a username, a password, a code, an alphanumeric or binary data string used for identifying the account holder 108, and the like or any combination thereof. After the account providers 114 send the unique client identifiers 120 to the aggregator service 102, the aggregator service stores the unique client identifiers 118 in the database 104 in a manner that associates the account holder 108 with each of the account holder's unique client identifiers 118 and with the account holder's dynamic password 116.

After the aggregator service 102 has collected unique client identifiers 118 for each of the accounts 124 held by the account holder 108, the account holder 108 is able to login to his or her accounts 124 using multi-factor authentication. The account holder 108 initiates the login process by accessing a web site provided by one of the account providers 114, for example Online Auction 114C, via a client system 106. The account holder 108 submits a first form of authentication, such as a username and/or password, and also submits the dynamic password 122 provided by the token device 110. The account provider 114C finds a unique client identifier 120C that is associated with the first form of authentication, as submitted by the account holder 108. The account provider 114C submits the unique client identifier 120C and the dynamic password 122 received from the account holder 108 to the aggregator service 102. The aggregator service 102 searches its database 104 of unique client identifiers 118 and dynamic passwords 116 to find a dynamic password that is associated with the unique client identifier 120C received from the account provider 114. The aggregator service 102 compares the value of the dynamic password 116 stored in the database 104 with the value of the dynamic password received from the account provider 114C.

In addition to transmitting the unique client identifier 120C and the dynamic password 122 to the aggregator service 102, the account provider 114C may also transmit a timestamp which indicates the time at which the dynamic password 122 was received from the client system 106. The timestamp may be used by the aggregator service 102 to ensure that the dynamic password received from the account holder 108 is being compared to the dynamic password 116 stored in the database 104 which was in existence at the time that the user submitted the login request. If the dynamic password 116 stored in the database 104 has changed between the time at which the account holder 108 submitted the dynamic password 122 and the time at which the aggregator makes the comparison, the presence of the timestamp ensures that the correct comparison is performed.

After the comparison of the dynamic password 122 submitted by the account holder 108 to the dynamic password 116 stored in the database 104, the aggregator service 102 provides the account provider 114C with a response based on the results of the comparison. For example, if the password submitted by the account holder 108 matches the dynamic password 116 at the aggregator service 102, the aggregator service 102 may instruct the account provider 114C to authenticate the account holder 108. Conversely, if the password submitted by the account holder 108 does not match the dynamic password 116, the aggregator service may instruct the account provider 114C not to authenticate the account holder 108. Alternatively, the aggregator service 102 may simply provide the results of the comparison, and the account provider 114C may then determine if the account holder 108 should be authenticated.

Finally, upon receiving the response from the aggregator service 102, the account provider 114C may either authenticate or not authenticate the account holder 108 of the client system 106. A message may also be communicated to the client system 106 indicating whether the login attempt was successful.

Figure 2:
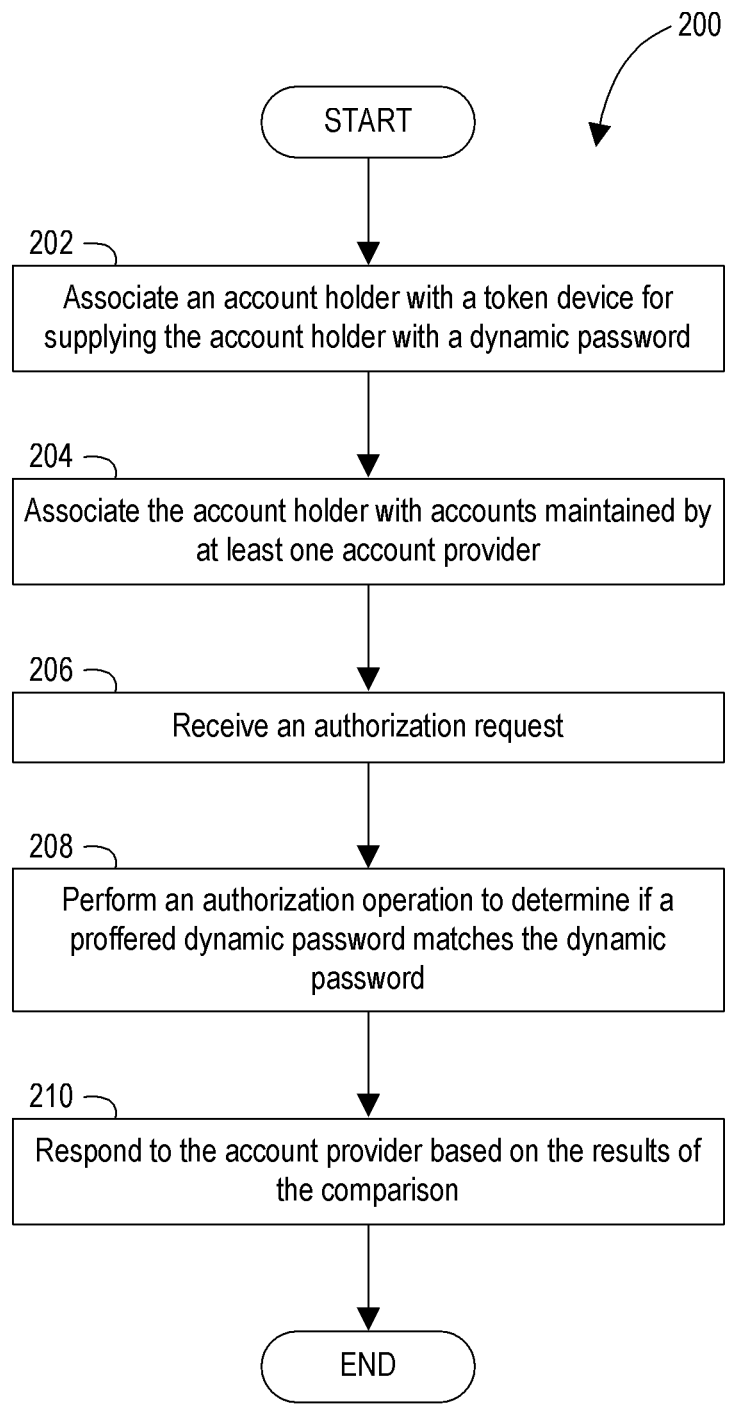
FIGS. 2 and 3 illustrate embodiments of methods for authenticating a user using multi-factor authentication.

FIG. 2 illustrates one embodiment of a method 200 of authenticating an account holder using multi-factor authentication. The method 200 may be practiced, for example, at an aggregator service in a distributed computing system that includes the aggregator service and one or more account providers. An account holder at the client system holds accounts with each or some of the account providers. The aggregator service or account providers provide the account holder with a token device, and the aggregator service associates 202 the account holder with the token device. The token device is configured to supply the account holder with a dynamic password. The value of the dynamic password is synchronously stored at both the aggregator service and at the token device. The current value of the dynamic password is synchronously changed periodically. The account provider and the aggregator service may have a preexisting trusted relationship, and may further communicate with one another over a secure communication channel.

In one embodiment, the current value of the dynamic password stored at the token device is controlled locally at the token device and is not controlled remotely by the aggregator service. For example, separate clocking device may be located at the aggregator service and at the token device, and the dynamic passwords are synchronously updated independently from one another using the clocking devices. In another embodiment, the current value of the dynamic password stored at the aggregator service and at the token device are both synchronously updated by the aggregator service. For example, the aggregator service may control the current value of the dynamic password stored at the token device via a wireless link to the token device.

As described previously the synchronous storage of the dynamic password preferably includes changing the values stored at the aggregator service and the token device at substantially the same time. However, the exact time at which the values are changed may understandably vary due to imperfections at the aggregator service and/or at the token device 110.

To provide multi-factor authentication, the aggregator service associates 204 the account holder with accounts maintained by at least one account provider, where the account holder is a separate entity from the aggregator service. This may include collecting a unique client identifier from each of the account providers for identifying the account holder. For example, as illustrated in FIG. 1, each of the account providers 114 may assign a unique client identifier 120 to the account holder 108 for identifying the holder 108 of the accounts 124. The aggregator service 102 collects unique client identifiers 120 from the account providers 114 for the account holder 108. For example, the account holder 108 may instruct each of the account providers 114 to provide the unique client identifiers 120 to the aggregator service 102.

Subsequent to an attempt by a user to login to one of the account holder's accounts, the aggregator service receives 206 an authorization request including a unique client identifier as identified by the user during the attempt to login. In one embodiment, the user may attempt to login to the account via a webpage interface. In one example, the authorization request also includes a dynamic password that is provided by the user's token device.

In one embodiment, the unique client identifier and dynamic password are provided to the aggregator service by the account provider after the account provider receives a login request, including the dynamic password, from the account holder. Thus, as illustrated in the FIG. 1 example, a user may attempt to login to an account 124 at the client system 106. The login attempt may require a first form of authentication, and a second form of authentication such as a proffered dynamic password. Based on the first form of authentication, the account provider 114 identifies a unique client identifier 120 which identifies the account holder 108. In one embodiment, the first form of authentication is the unique client identifier 120. The proffered dynamic password submitted by the user and the unique client identifier 120, as identified by the user, are then communicated from the account provider 114 to the aggregator service 102. However, in another embodiment, the login attempt is received by the aggregator service 102 directly from the user.

Referring once again to FIG. 2, the aggregator service performs an authorization operation 208 for determining if the proffered dynamic password submitted by the a user during the attempt to login to the selected account matches the current value of the dynamic password stored at the aggregator service. In one embodiment, performing the authorization operation 208 includes receiving the proffered password as part of the authorization request, either from the user or via the account provider. The aggregator service then compares 208 the proffered dynamic password submitted by the user to the dynamic password synchronously stored at the aggregator service. In the example of FIG. 1, after receiving the proffered dynamic password and unique client identifier 120 from the account provider 114, the aggregator service 102 identifies the dynamic password 116 that is associated with the unique client identifier 120 received from the account provider. Then, the aggregator service 102 compares the proffered dynamic password to the identified dynamic password 116 stored in the database 104.

After evaluating the authentication data, the aggregator service responds 210 to the account provider of the selected account based on the results of the comparison. For example, the response may include an indicator of whether or not the user should be authenticated. Alternatively, the response may include the results of the comparison performed in act 208. Referring once again to FIG. 1, after performing the comparison 208, the aggregator service 102 provides a response to the appropriate account provider 114 based on the result of the comparison. Following the response, the account provider 114 may either authenticate the user or deny access to the user. The aggregator service assists in ensuring, prior to providing account access to a user attempting to login, that the user is in fact the account holder 108.

In another embodiment, performing the authorization operation 208 includes sending the current value of the dynamic password stored at the aggregator service to the account provider. The account provider can then determine if the proffered dynamic password matches the current value of the dynamic password.

In one embodiment, a timestamp may also be associated with the dynamic passwords to ensure that the proffered dynamic password is being compared to a dynamic password which was in existence at the time that the user submitted the proffered dynamic password. Similarly, an expiration date may be associated with the dynamic passwords to indicate when the password was scheduled to expire.

Figure 3:
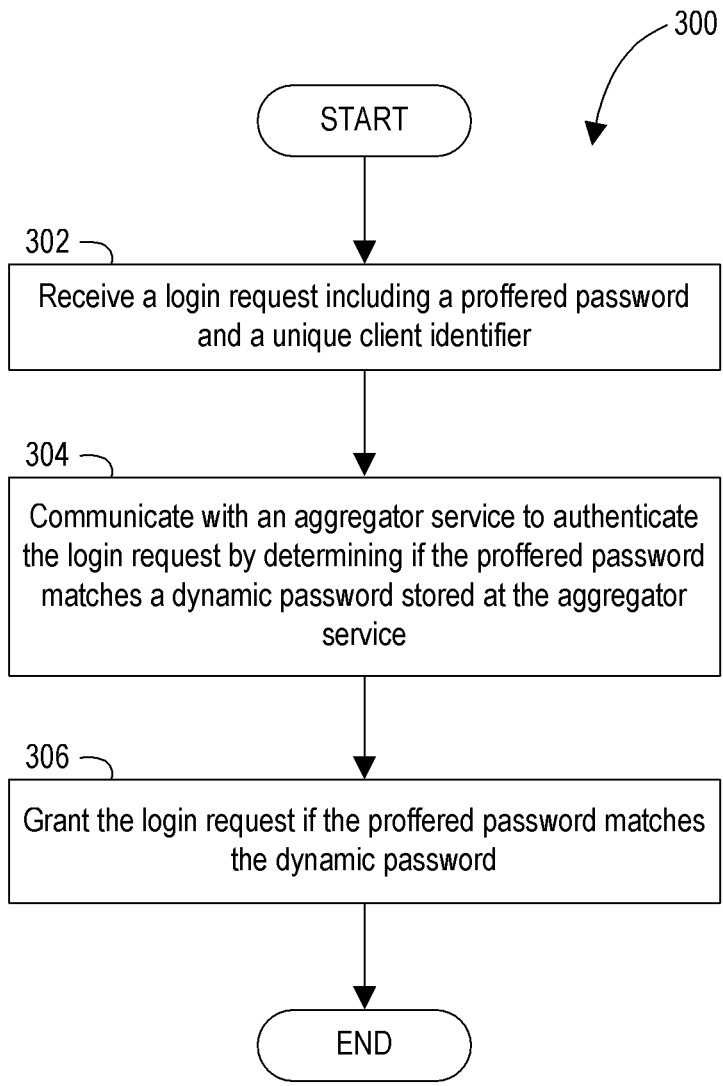

Referring now to FIG. 3, a method 300 is illustrated of authenticating an account holder using multi-factor authentication. The method 300 may be practiced, for example, at an account provider within a distributed computing system that includes an aggregator service and the account provider. The account provider may include one or more computer-readable media having computer-executable instructions, that when executed, implement the method 300.

The account provider receives 302 a login request from a user including a proffered password and a unique client identifier for identifying an account holder. In one embodiment, the unique client identifier and the proffered dynamic password are submitted by the user via a webpage interface.

The account provider then communicates 304 with an aggregator service to authenticate the login request. The account provider works in conjunction with the aggregator service to determine if the proffered password matches a current value of a dynamic password that is synchronously stored at the aggregator service and at a token device provided to the account holder. In one embodiment, the account provider and the aggregator service have a preexisting trusted relationship, and communicate with one another over a secure communication channel.

In one embodiment, communicating 304 with an aggregator service to authenticate the login request more specifically includes sending an authorization request to the aggregator service including the proffered password. After the aggregator service compares the proffered password to the current of the dynamic password stored at the aggregator service, a response is received from the aggregator service indicating whether the passwords match.

In another embodiment, communicating 304 with an aggregator service to authenticate the login request more specifically includes sending an authorization request to the aggregator service including the unique client identifier. The current value of the dynamic password is received from the aggregator service. The account provider then determines if the proffered dynamic password matches the current value of the dynamic password.

The account provider then grants 306 the login request if the proffered password matches the current value of the dynamic password that is synchronously stored at the aggregator service.

Embodiments herein may comprise a special purpose or general purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At an aggregator service within a distributed computing system that includes the aggregator service and a plurality of different account providers, wherein an account holder is an owner of a plurality of accounts, at least one account of the plurality with each of the different account providers, a method for authenticating the account holder using multi-factor authentication, the method comprising:

associating, by the aggregator service, the account holder with a single token device, the token device configured to supply the account holder with a single dynamic password linking the account holder with the token device and with the plurality of accounts, at least one account of the plurality with each of the different account providers, the dynamic password having a current value that is synchronously stored at the aggregator service and at the token device, wherein the current value of the dynamic password stored at the token device is updated using a first clocking device, wherein the current value of the dynamic password stored at the aggregator service is updated using a second clocking device, and wherein the first clocking device at the token device and the second clocking device at the aggregator service synchronously update the dynamic password independent of each other;

periodically changing, using a plurality of processor-based computing devices programmed to perform the periodic changing, the current value of the dynamic password by synchronously generating and storing a single, different dynamic password at the aggregator service and at the token device, wherein the periodic changing is programmed to pull the current value of the dynamic password from a table of password values;

associating the account holder with a different client identifier for each of the account providers, each client identifier linking the account holder to the at least one account with one of the account providers, the account providers each being a separate entity from the aggregator service;

receiving a request for authorization to login to a selected account of the plurality of accounts with one of the account providers, the request including the client identifier linking the account holder to the selected account and a proffered password generated by the token device, wherein the dynamic password and the proffered password submitted by a user are associated with a timestamp for indicating a time at which the dynamic password and the proffered password were previously updated; and performing an authorization operation by determining the dynamic password associated with the account holder using the client identifier and by determining a match between the proffered password received with the request for authorization to login to the selected account and the current value of the dynamic password stored at the aggregator service and associated with the account holder.

2. The method as recited in claim 1, wherein performing an authorization operation by determining a match between the proffered password and the current value of the dynamic password stored at the aggregator service further comprises:

receiving the proffered password as part of the authorization request;

comparing the proffered password to the current value of the dynamic password stored at the aggregator service; and sending a response to the account provider of the selected account based on the result of the comparison.

3. The method as recited in claim 2, wherein the response to the account provider further comprises an affirmative or a negative result depending on whether the proffered password matches the current value of the dynamic password.

4. The method as recited in claim 1, wherein performing an authorization operation by determining if the proffered password matches the current value of the dynamic password stored at the aggregator service further comprises sending the current value of the dynamic password stored at the aggregator service to the account provider for allowing the account provider to determine a match between the proffered dynamic password and the current value of the dynamic password.

5. The method as recited in claim 1, wherein the client identifier and the proffered dynamic password are submitted by a user via a webpage interface.

6. The method as recited in claim 1, wherein the dynamic password and the proffered password submitted by the user are associated with an expiration time for indicating a time at which the dynamic password and the proffered password are scheduled to expire.

7. The method as recited in claim 1, wherein the unique client identifier further identifies the selected account.

8. The method as recited in claim 1, wherein the request for authorization to login to a selected account is received from the account provider.

9. The method as recited in claim 1, wherein the account provider and the aggregator service have a preexisting trusted relationship, and communicate over a secure communication channel.

10. At an account provider within a distributed computing system that includes an aggregator service and the account provider, a method for authenticating an account holder using multi-factor authentication, the method comprising:
   generating a single dynamic password that is synchronously stored at the aggregator service and at a token device provided to the account holder, the dynamic password that links the account holder with the token device and with a plurality of accounts held by the account holder with different account providers, wherein the current value of the dynamic password stored at the token device is controlled by a clock device;
   storing, at the aggregator service, a unique client identifier that links the account holder with a single account of the plurality of accounts held by the account holder with different account providers;
   receiving a login request including a proffered password and a first form of authentication for identifying the account holder;
   associating, at the aggregator service, the first form of authentication with the account holder to determine the unique client identifier that links the account holder with the single account of the plurality of accounts held by the account holder with different account providers;
   communicating with the aggregator service to authenticate the login request by identifying the dynamic password associated with the stored unique client identifier and determining a match between the proffered password and a current value of the dynamic password stored at the aggregator service, wherein determining the match between the proffered password and the current value of the dynamic password stored at the aggregator service comprises comparing a timestamp indicating the time at which the dynamic password was updated with a time at which the login request including the proffered password was submitted by the user to ensure that the proffered password is compared to the dynamic password stored at the aggregator service at the time the login request was received;
   periodically changing, using a plurality of processor-based computing device programmed to perform the periodic changing, the current value of the dynamic password by synchronously generating and storing another dynamic password different from the dynamic password at the token device and the aggregator service wherein the periodic changing is programmed to pull the current value of the dynamic password and from a table of password values, wherein
   a first clocking device controlled by the token device, and a second clocking device controlled by the aggregator device, synchronously update the dynamic password independent of each other; and
   granting the login request in the event the proffered password matches the current value of the dynamic password.

11. The method as recited in claim 10, wherein communicating with the aggregator service to authenticate the login request further comprises:
   sending an authorization request to the aggregator service including the proffered password; and
   receiving a response from the aggregator service indicating whether the proffered password matches the current value of the dynamic password stored at the aggregator service.

12. The method as recited in claim 10, wherein communicating with the aggregator service to authenticate the login request further comprises:
   sending an authorization request to the aggregator service including the unique client identifier;
   receiving the current value of the dynamic password stored at the aggregator service from the aggregator service; and
   determining a match between the proffered password and the current value of the dynamic password.

13. The method as recited in claim 10, further comprising providing a webpage interface for submitting the unique client identifier and the proffered dynamic password.

14. The method as recited in claim 10, further comprising associating the dynamic password and the proffered password with a time at which the dynamic password and the proffered dynamic password are scheduled to expire.

15. The method as recited in claim 10, wherein assigning the unique client identifier that links an account holder to at least one account provider comprises associating the unique client identifier with the dynamic password.

\* \* \* \* \*